Sept. 25, 1951  O. TALLAKSEN  2,569,119
FISHING LURE
Filed Feb. 4, 1946
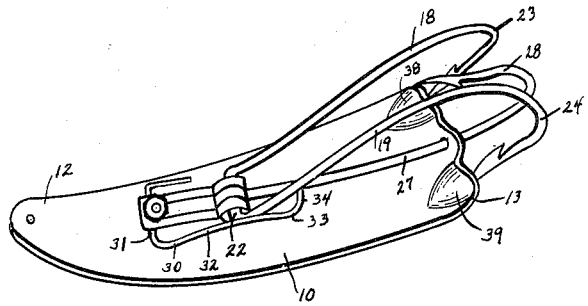
Fig. I.
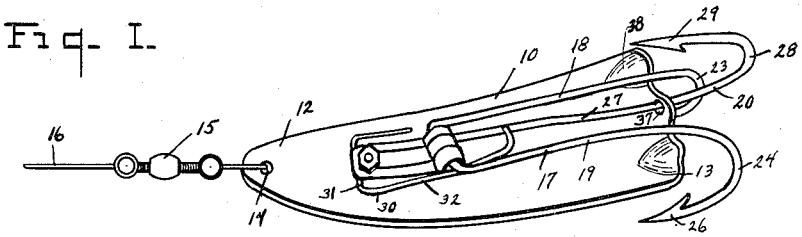
Fig. II.
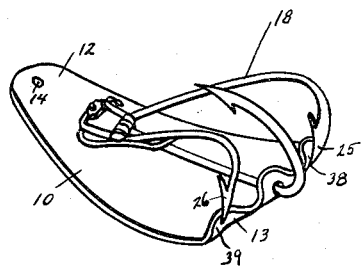
Fig. III.
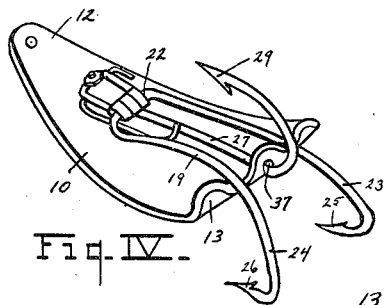
Fig. IV.
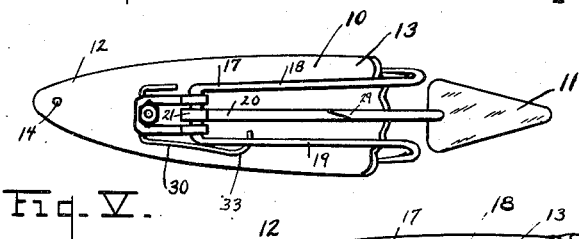
Fig. V.
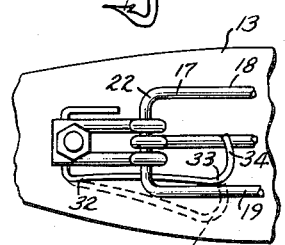
Fig. VII.
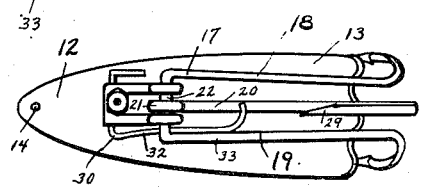
Fig. VI.
INVENTOR.
OLAF TALLAKSEN.
BY
Joseph B. Lindecker
ATTORNEY.

Patented Sept. 25, 1951

2,569,119

UNITED STATES PATENT OFFICE 2,569,119

FISHING LURE

Olaf Tallaksen, Chicago, Ill., assignor of one-half to Joseph B. Lindecker, Skokie, Ill.

Application February 4, 1946, Serial No. 645,320

7 Claims. (Cl. 43—42.41)

This invention relates to an artificial bait and the primary object is to provide an improved fish bait which is particularly adapted to casting and trolling.

A feature of the invention resides in a novel device or spoon with the arrangement of a plurality of fish hooks and their supporting member whereby, when said hooks are in their normal position the device may be used in water containing grass, seaweed or the like and the danger of said grass or seaweed catching onto the hooks carried thereby is greatly lessened.

Another feature of the invention is to provide a spoon with a rigid fish hook which extends upwardly and is positioned between a pair of downwardly positioned spring actuated fish hooks, the barb on each of the latter fish hooks being positioned or arranged to rest against or in furrows made in the rear of the body of the spoon so that the device may be used as a weedless spoon prior to being attacked by a fish; similar to the lure described in my copending United States application filed March 17, 1945, Serial Number 583,245, now Patent No. 2,414,425, January 14, 1947.

Another feature of the present invention is to provide a new and improved spoon as described above and having an improved type spring in combination with said downwardly extending fish hooks; said spring causing the spoon to be a substantially weedless lure prior to an attack by a fish and a non-weedless lure after an attack or after the hooks are once pressed downwardly into open position.

A still further feature is to provide a new and improved spoon, being of a weedless type prior to a downward movement of the two downwardly positioned and operated fish hooks and a non-weedless type after said hooks are moved downwardly, said hooks being held in both positions by a spring which yields its greatest upward force when the hooks are in a weedless arrangement with said spoon, the force of said spring decreasing as the pair of downwardly directed hooks are pressed downwardly into open position, the spring being so designed as to hold the hooks in the lowermost position, or non-weedless position once the hooks are pressed to said open or lowermost position.

And still another feature is to provide a spoon as explained above, having a spring that will release the hooks when in non-weedless position by giving the spoon a quick jerk, said spring then forcing the movable hooks upwardly and holding them in locked position to provide a weedless spoon.

A further feature is to produce a device of this character which is economical to manufacture, and simple to employ.

Other features, objects and advantages will be apparent during the course of the following description.

In the accompanying drawings forming a part of this specification and in which like numerals are employed to designate like parts throughout the same:

Figure I is a side perspective view showing my improved casting and trolling spoon with hooks arranged in weedless position.

Figure II is a perspective view similar to Figure I with the downwardly directed hooks in lowermost position forming a non-weedless bait.

Figure III is a perspective view showing the top and the rear end of said spoon with the hooks in weedless position.

Figure IV is a perspective view similar to Figure III with the downwardly directed hooks in lowermost position forming a non-weedless bait.

Figure V is a top plan view of my improved lure with the hooks in weedless position.

Figure VI is a top plan view of my improved lure with hooks in non-weedless position, and showing clearly how the spring holds the outside hooks in said position.

Figure VII is a fragmentary, enlarged, top plan view of the lure as shown in Figure VI with dotted lines showing the position of the spring as shown in Figure V.

Referring to the drawing by character of reference the numeral 10 designates in general an elongated bowl of the spoon having an upper concave surface and a lower convex surface. The bowl 10 is provided with a tapering body converging to a front rounded end 12, with the rear end 13 thereof being larger than the front end of said bowl. In the front end 12, an aperture 14, or any suitable means, is provided for loosely receiving a swivel 15 having a line 16 attached thereto as shown in Figure II. In practice the concavo-convex bowl 10 of the spoon is heavy enough to aid in insuring the travel of the lure through the water with the hooks in uppermost position as shown in Figures I, III and V. A strip, or chunk, of pork 11, attached to the rear of the spoon will also insure the proper position of the lure in the water, the spring and rigid parts always remaining on top of the spoon. The spoon 10 may be made of light weight metal and plated or coated with paint, however I do not limit myself to the use of metal.

Dual-type hook-like members are usually employed to produce this device which is economical to manufacture. A dual or double ended fish hook 17, with shanks 18 and 19, or two separate hooks secured together to act as a dual hook, is movable as hereinafter described. Another fish hook 20 may be referred to as the stationary member in that it is fixed relative to the bowl 10, said hook 20 having an eye 21 secured to cross member 22 of said hook 17. Since said hook 20 is stationary it may be soldered, welded or otherwise secured to said bowl 10 if desired. Said member 17 with cross member 22 has shanks 18 and 19 formed from a single piece of wire, said shanks extending parallel to each other, or substantially so, the greater part of their distance and have curved end portions 23 and 24. Said end portions 23 and 24 form hooks curved downwardly and backwardly, and further formed at the extremities thereof with barbs 25 and 26. The stationary hook 20 is provided with a shank 27 and an upwardly and backwardly curved hook 28, with a barb 29 at the extremity of the backwardly turned portion. The hooks 23 and 24 are normally held yieldingly in position by a spring 30 whereby the points 25 and 26 are held in contact with the furrows 38 and 39, protecting said points 25 and 26 from snagging. When said hooks 23 and 24 are moved downwardly, the barbs or points 25 and 26 as well as barb 29 become exposed and form a non-weedless bait. The spring 30 has a rigid section 31, a long flexible section 32, a curved portion 33 and straight end portion 34. When the hook 17 is in upper position the end portion 34 rests against shank portion 19 and holds said hook 17 with its greatest force. When the hooks 23 and 24 are forced downwardly the end portion 34 is forced inwardly as well as downwardly, so that section 32 becomes lodged beneath cross member 22, and at the same time the curved portion 33 rests against the shank 19 to hold it in downward position, which causes barbs 25 and 26 to be exposed beneath the spoon 10. See Figures II, IV and VI. The tension and holding power of the spring in this position is slight and if it is desired that the bait become weedless again, it is only necessary to give the lure a jerk releasing shank 19 from said curved portion 33 and the spring immediately forces the shanks 18 and 19 upwardly. This is only possible because of the novel spring design where the spring strength decreases as the shanks are pressed downwardly, yet is capable of holding said shanks in downward position. This feature is made possible by designing a spring which has a portion thereof which slides beneath said cross member 22 to destroy the upward force of the spring, to thereby establish a new pivot point and cause the spring to exert a downward force upon the movable hooks instead of an upward force, thereby providing the necessary force to convert the weedless bait into a non-weedless bait and hold same in this arrangement until released by a jerk or otherwise.

The bowl 10 is stamped or formed with an upper concave surface, with aperture 14 in the forward end 12 thereof. An aperture 37 is formed in the rear portion 13 thereof through which extends the shank 27 of the stationary hook 20, before curving upwardly to form the hook 28. This arrangement provides a lure where two members which form weed guards become two open unobstructed hooks after the lure is struck by a fish.

The hooks incorporated with this type spoon may be assembled as shown in this application, or as shown in my co-pending United States application Serial No. 583,245 filed March 17, 1945, now Patent No. 2,414,425, January 14, 1947, or by any method known by those skilled in the art of making lures.

This type lure performs much better in the water when a strip of pork rind, or a chunk of pork and rind is attached to the stationary hook arranged between the movable hooks, whereby said pork chunk drags in the water causing the lure to dart from side to side as it is pulled through the water.

It is to be understood that the form of my invention herewith shown and described is to be taken as a preferred example of the same and that various changes relative to the material, size, shape and arrangement of parts may be resorted to without departing from the spirit of the invention or the scope of the invention of the subjoined claims.

Having thus described my invention, what I claim as new and desire to protect by Letters Patent is:

1. In fish lures having a plurality of movable hooks which may be moved from normal position to open position and returned, comprising a non-buoyant body, means for attaching a line near the forward end of the body, a plurality of movable hooks, said hooks having a common cross member, a mounting for said hooks secured near the forward end of said body, said cross member being pivotally secured by said mounting and elevated from said body, the free ends of said pivoted hooks positioned to extend downwardly over the rear end of said body, a rigid upwardly directed hook positioned and secured between said pivoted hooks, a spring associated with said mounting, said spring having a forward end portion rigidly secured to said body, said spring having a free curved rear end portion assembled to engage with the shank portion of one of said movable hooks, said spring having a flexible central portion between said end portions, said central portion adapted to move beneath said elevated cross member when said movable hooks are moved into open position, whereby said rear end portion of said spring engages a shank portion of one of said movable hooks and resiliently holds said movable hooks in open position as the cross member decreases the upward force of the spring by creating a new pivot point whereby the spring now tends to exert a downward force instead of an upward force, and said spring being adapted by upward pressure on the movable hooks to be released from said position beneath said cross member and again force said movable hooks to the upward and normal position.

2. In fish lures having a movable dual type fish hook, comprising a body, means for attaching a line near the forward end of the body, a dual type fish hook with two parallel shanks and a common cross member connecting said shanks, the free ends of said dual hook forming pointed hooks, said pointed hooks positioned to extend downwardly over the rear end of said body, a mounting for said dual hook secured near the forward end of said body, said common cross member being pivotally secured and elevated from said body by said mounting, a rigid hook mounted at its forward end on said common cross member and rigidly positioned in the space between the parallel shanks of said dual hook, the rear end of said rigid hook forming a curved upwardly directed pointed hook, a spring associated with said mounting, said spring having a forward end portion rigidly secured by said mounting, said spring having a curved rear end portion extending laterally with respect to said body and assembled to engage with the shank portion of one of said movable hooks, said spring having a flexible central portion between said end portions, said central portion adapted to move beneath a portion of said elevated cross member when said movable pointed hooks are moved into open position, said rear end portion of said spring engaging the shank portion of one of said movable hooks and adapted to resiliently hold said movable hooks in open position, and said spring being adapted by upward pressure on the movable hooks to be released from said position beneath said cross member and again force said movable hooks to the upward and normal position.

3. In fish lures having a movable dual type fish hook, comprising a body, means for attaching a line near the forward end of the body, a dual type fish hook with two parallel shanks and a common cross member connecting said shanks, the free ends of said dual hook forming pointed hooks, said pointed hooks positioned to extend downwardly over the rear end of said body, a mounting for said dual hook secured near the forward end of said body, said common cross member being pivotally secured and elevated from said body by said mounting, a rigid hook mounted at its forward end on said common cross member and rigidly positioned in the space between the parallel shanks of said dual hook, the rear end of said rigid hook forming a curved upwardly directed pointed hook, a spring associated with said mounting, said spring having a forward end portion rigidly secured by said mounting, said spring having a curved rear end portion extending laterally with respect to said body and assembled to engage with the shank portion of one of said movable hooks, said spring having a flexible central portion between said end portions, said central portion adapted to move beneath a portion of said elevated cross member when said movable pointed hooks are moved into open position, said rear end portion of said spring engaging the shank portion of one of said movable hooks and adapted to resiliently hold said movable hooks in open position, said spring being adapted by upward pressure on the movable hooks to be released from said position beneath said cross member and again force said movable hooks to the upward and normal position, and when the movable pointed hooks are in the upper and normal position, the shank and base portions of the movable hooks serve to protect the pointed end of the rigid hook, the bottom surface of the rear end of the body serving to protect the pointed ends of the movable hooks from entanglement with weeds or the like, and said downwardly directed hooks providing unobstructed hooks when moved to the lower open position when struck by a fish.

4. In fish lures, a non-buoyant concavo-convex body with furrows in the rear end thereof, means for attaching a line near the forward end of the body, a plurality of movable hooks, said hooks having a common cross member, a mounting for said hooks secured near the forward end of said body, said cross member being pivotally secured by said mounting and elevated from said body, the free ends of said pivoted hooks positioned to extend downwardly over the rear end of said body, a rigid upwardly directed hook positioned and secured between said pivoted hooks, a spring associated with said mounting, said spring having a forward end portion rigidly secured to said body, said spring having a free curved rear end portion assembled to engage with the shank portion of one of said movable hooks, said spring having a flexible central portion between said end portions, said central portion adapted to move beneath said elevated cross member when said movable hooks are moved into open position, whereby said rear end portion of said spring engages a shank portion of one of said movable hooks and resiliently holds said movable hooks in open position as the cross member decreases the upward force of the spring by creating a new pivot point whereby the spring now tends to exert a downward force instead of an upward force, said spring being adapted by upward pressure on the movable hooks to be released from said position beneath said cross member and again force said movable hooks to the upward and normal position, the furrows in the bottom end of the body serving to protect the pointed ends of the moveable hooks from entanglement with weeds or the like, and said downwardly directed hooks providing unobstructed hooks when moved to the lower open position when struck by a fish.

5. In fish lures, a non-buoyant concavo-convex body, means for attaching a line at the forward end of said body, a dual type fish hook having barbed free ends and two parallel shanks with a common cross member between said shanks, the free ends of said shanks of said dual hook forming downwardly directed barbed hooks positioned adjacent the rear end of said body, a mounting for supporting said dual fish hook secured to the concave side of said body, said mounting being positioned at the same end of the body as the line attaching means, said cross member being pivoted to said mounting, a rigid hook having an eye portion with the eye assembled upon the cross member between said parallel shanks of the dual hook, said rigid hook having its shank extending to the rear of said body and with its curved hook portion directed upwardly and positioned between said pivoted shanks, furrows located on said concavo-convex body adapted to receive the pointed ends of said pivoted barbed hooks when in normal position, a spring for resiliently holding said pointed ends within said furrows when said shanks are in normal position, said spring having one end thereof rigidly secured at the forward end of said body, the opposite end of said spring having a laterally curved portion assembled to engage with one of said shanks, said cross member held by said mounting in an elevated position from said body, the intermediate portion of said spring constructed and arranged to move beneath said cross member when said shanks of said dual hook are moved from their normal position to open position, and the curved free end portion of said spring contacting and resiliently holding said dual type fish hook adjacent said body when in open position, said hooks serving to protect each other from entanglement with objects when they are in their normal position.

6. A fish bait of the class described, comprising a body; a movable dual hook; said dual hook having a cross member pivotally secured in an elevated position to the forward end of said body; said dual hook having shank portions extending at right angles to said cross member and substantially parallel with each other, and two downwardly projecting hook portions with pointed ends; a single hook positioned and rigidly secured between said shanks and said movable dual hook; said single hook being secured to said cross member of said dual hook; furrows located on the under surface of the rear end of said body and adapted to receive the pointed ends of said dual hook; a spring means having a holding portion at its forward end thereof, a rear free end portion and a flexible intermediate portion; said holding end portion of said spring being assembled and rigidly secured on the forward end of said body adjacent to one of said shank portions of said dual hook; said rear free end portion of said spring having a curved portion and assembled to contact a shank portion of said dual hook thereby holding said dual hook in its upper or closed position; said intermediate portion of said spring positioned and arranged to slip between said cross member of said dual hook and said body when the shank portions of said dual hook are moved downwardly; said cross member forming a new pivot point for said spring causing said spring to hold said dual hook in open position; said dual hook having its pointed ends in said furrows when in its upper or closed position and in said position the shank portions of said dual hook protect the pointed end of said single hook from entanglement with weeds whenever used in water where weeds prevail and whenever said dual hook is in closed position.

7. A fish lure; comprising a non-buoyant concavo-convex body having means to attach a line at the forward end of said body; a movable dual type hook having two downwardly directed and substantially similar shaped hooks with a common cross member; a mounting secured to said body; said mounting being provided for elevating and pivotally securing said cross member of said hook near the forward end of the body; a rigid upwardly directed hook positioned between said pivoted hooks having its forward end mounted upon said cross member; a spring having a forward end, a rear end and an intermediate portion between its ends; the forward end of said spring being rigidly secured to said body; the rear end of said spring having a curved portion resiliently contacting the shank portion of one of said downwardly directed hooks and inhibiting the downward movement thereof but permitting said downwardly directed hooks to be simultaneously moved relative to the body when struck by a fish; the intermediate portion of said spring constructed and arranged to slip between said cross member and said body when the shank portions of the dual hook are moved downwardly; said cross member forming a new pivot point for said spring causing said spring to hold said dual hook in open position until said shank portions of said dual hook are moved upwardly to closed position; the barbed end of the rigid hook being protected by the shank and bight portions of the pivoted hooks when they are in their normal position; said body having recesses located on its under surface at the rear end thereof; said recesses adapted to receive the barbed ends of said pivoted hooks; and said single hook and said dual hook serving to protect each other to a great extent from entanglement with weeds when used in water containing the same.

OLAF TALLAKSEN.

REFERENCES CITED

The following references are of record in the file of this patent:

UNITED STATES PATENTS

| Number | Name | Date |
| --- | --- | --- |
| 2,414,425 | Tallaksen | Jan. 14, 1947 |